United States Patent
Ting et al.

(10) Patent No.: US 11,829,611 B2
(45) Date of Patent: Nov. 28, 2023

(54) ELECTRONIC DEVICE AND HIBERNATION RECOVERY METHOD THEREOF

(71) Applicant: Realtek Semiconductor Corporation, Hsinchu (TW)

(72) Inventors: Yu-Ting Ting, Hsinchu (TW); Sheng-Tzu Yang, Hsinchu (TW); Chang-Hao Wu, Hsinchu (TW); Chen-Wei Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 119 days.

(21) Appl. No.: 17/506,737

(22) Filed: Oct. 21, 2021

(65) Prior Publication Data
US 2022/0300170 A1 Sep. 22, 2022

(30) Foreign Application Priority Data
Mar. 16, 2021 (TW) .................. 110109448

(51) Int. Cl.
G06F 3/06 (2006.01)
G06F 21/79 (2013.01)
G06F 21/60 (2013.01)

(52) U.S. Cl.
CPC .......... G06F 3/0623 (2013.01); G06F 3/0634 (2013.01); G06F 3/0659 (2013.01); G06F 3/0679 (2013.01); G06F 21/602 (2013.01); G06F 21/79 (2013.01)

(58) Field of Classification Search
CPC .... G06F 3/0623; G06F 3/0634; G06F 3/0659; G06F 3/0679; G06F 21/602; G06F 21/79
See application file for complete search history.

(56) References Cited

U.S. PATENT DOCUMENTS

| 10,162,543 | B1* | 12/2018 | Patel | G06F 3/0683 |
| 2004/0003273 | A1* | 1/2004 | Grawrock | G06F 21/79 |
| | | | | 713/193 |
| 2014/0006799 | A1* | 1/2014 | Zmudzinski | G06F 1/3243 |
| | | | | 713/189 |
| 2016/0055102 | A1* | 2/2016 | de Cesare | G06F 21/79 |
| | | | | 713/193 |
| 2016/0282927 | A1* | 9/2016 | Adams | G06F 21/575 |
| 2017/0147363 | A1* | 5/2017 | Sun | G06F 9/485 |

(Continued)

FOREIGN PATENT DOCUMENTS

| CN | 106775609 A | 5/2017 |
| TW | I245182 B | 12/2005 |

*Primary Examiner* — Tracy A Warren
(74) *Attorney, Agent, or Firm* — Locke Lord LLP; Tim Tingkang Xia, Esq.

(57) ABSTRACT

An electronic device includes a temporary memory, a non-volatile memory and a processor. The temporary memory includes at least one secure region. The non-volatile memory is configured to store at least one higher-level secure program and a plurality of commands. The processor is connected to the temporary memory and the non-volatile memory for executing the plurality of commands to: when receiving a wake-up command, initialize the at least one secure region; and through the at least one higher-level secure program, recover the at least one secure region, or decrypt encrypted data stored in the non-volatile memory to recover the at least one secure region. In addition, a hibernation recovery method is also disclosed herein.

20 Claims, 5 Drawing Sheets

(56) References Cited

U.S. PATENT DOCUMENTS

2017/0177381 A1* 6/2017 Altman .................. G06F 21/81
2021/0182435 A1* 6/2021 Hunacek ................ G06F 21/72
2021/0397700 A1* 12/2021 Stapf .................. G06F 12/1491

* cited by examiner

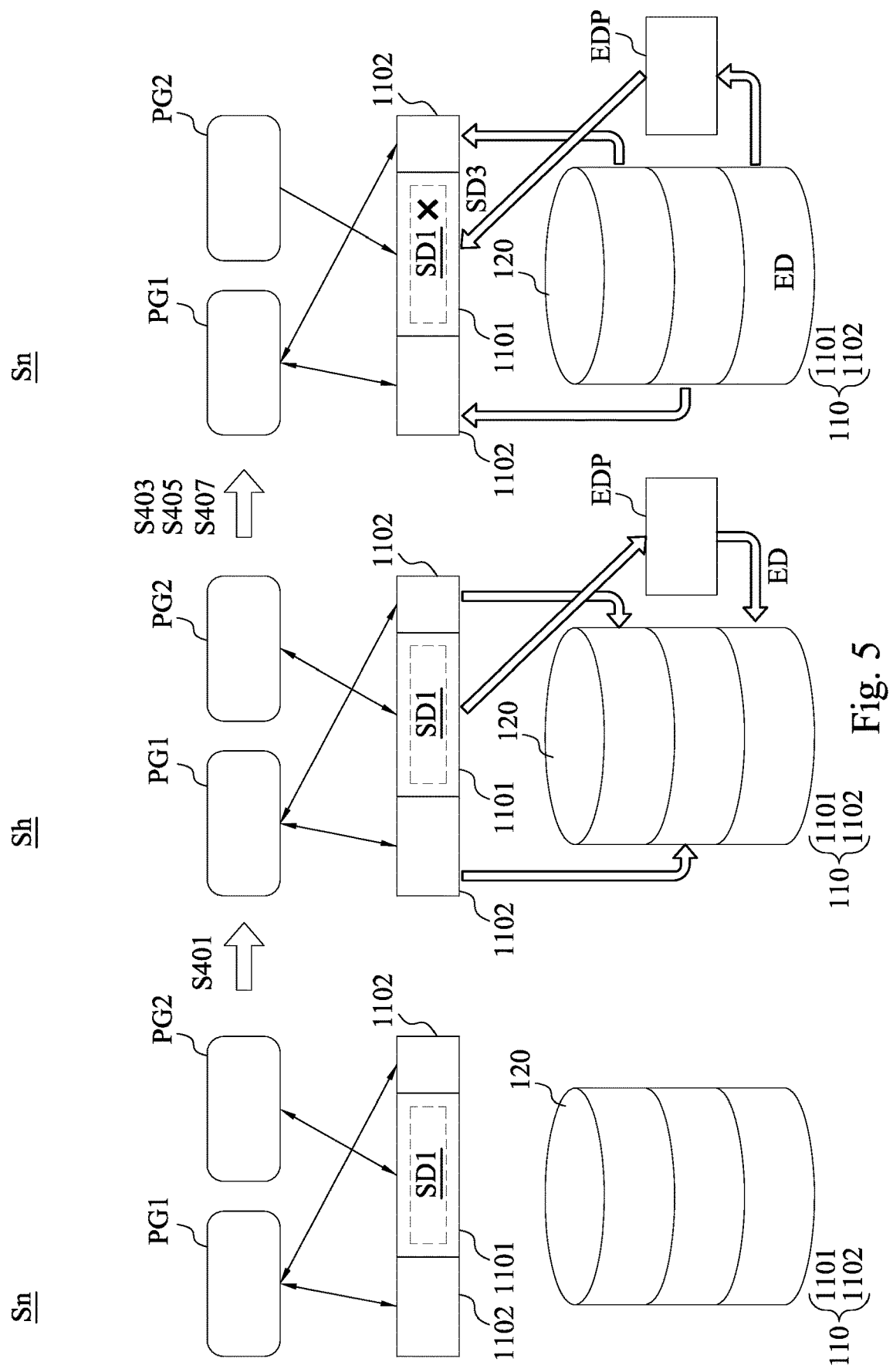

ELECTRONIC DEVICE AND HIBERNATION RECOVERY METHOD THEREOF

CROSS-REFERENCE TO RELATED APPLICATION

This application claims priority to Taiwan Application Serial Number 110109448, filed Mar. 16, 2021, which is herein incorporated by reference in its entirety.

BACKGROUND

Field of Disclosure

The present disclosure relates to an electronic device and hibernation recovery method thereof.

Description of Related Art

In order to reduce energy consumption of a computer system, in addition to a normal state, the computer system also has a hibernation state. The computer system stops operations of some modules in the hibernation state, only keep necessary modules, and quickly recover to the normal state when triggered by external signals. Accordingly, an effect of power saving can be achieved.

Further, before the computer system enters the hibernation state, data is often backed up, so that when the computer system returns to the normal state, the computer system returns to the operating scenario before the hibernation state. However, for various data with high-secure levels, the computer system is often unable to directly back them up, which will cause the computer system to be unable to recover to the operating scenario before the hibernation state when the computer system returns to the normal state.

SUMMARY

The disclosure provides an electronic device, which includes a temporary memory, a non-volatile memory and a processor. The temporary memory includes at least one secure region. The non-volatile memory is configured to store at least one higher-level secure program and a plurality of commands. The processor is connected to the temporary memory and the non-volatile memory for executing the plurality of commands to: when receiving a wake-up command, initialize the at least one secure region; and through the at least one higher-level secure program, recover the at least one secure region, or decrypt encrypted data stored in the non-volatile memory to recover the at least one secure region.

The disclosure provides a hibernation recovery method, which includes following steps: when receiving a wake-up command, initializing at least one secure region in a temporary memory; and through at least one higher-level secure program stored in a non-volatile memory, recovering the at least one secure region, or decrypting encrypted data stored in the non-volatile memory to recover the at least one secure region.

Based on above, the electronic device and hibernation recovery method thereof of the embodiments of the present disclosure can recover the data of the secure region by using the tags corresponding to the secure region with the high-secure level in the temporary memory, or pre-encrypt and back up the data in the secure region with the high-secure level in the temporary memory to recover the data in the secure region.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5 is a schematic diagram of the hibernation recovery method according to other embodiments of the present disclosure.

DETAILED DESCRIPTION

Figure 1:
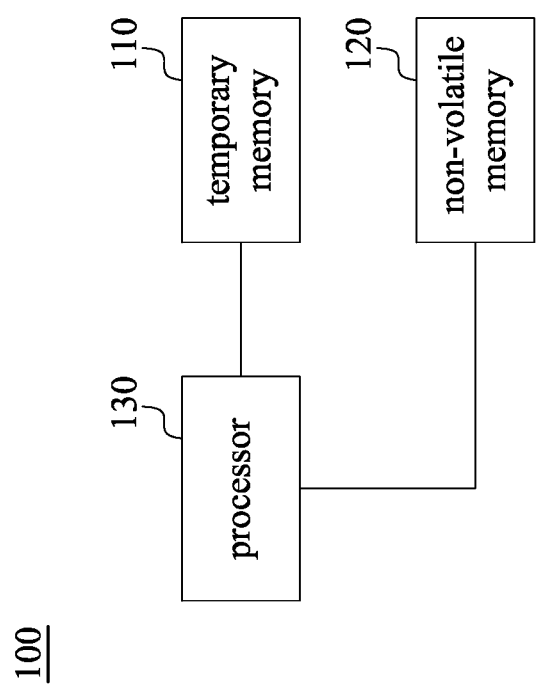
FIG. 1 is a block diagram illustrating an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram illustrating an electronic device according to an embodiment of the disclosure. Referring to FIG. 1, the electronic device 100 includes a temporary memory 110, a non-volatile memory 120 and a processor 130. The electronic device 100 is, for example, a smart phone, a tablet computer, a notebook computer, a desktop computer, or a set-top box and other devices (e.g., a set-top box of digital rights management streaming (DRM streaming) platform) that require a secure architecture, and there is no particular limitation.

Furthermore, the temporary memory 110 includes at least one secure region. The non-volatile memory 120 is used to store at least one higher-level secure program and multiple commands. The processor 130 is connected to the temporary memory 110 and the non-volatile memory 120 to execute these commands.

In some embodiments, the temporary memory 110 can further include at least one normal region. In further embodiments, when the processor 130 receives a high-secure level command (e.g., a secure monitor call (SMC) commands of an ARM CPU), the processor 130 can read and write data in the secure region in a high-secure level state (e.g., a trusted execution environment (TEE) of the ARM CPU). On the contrary, when the processor 130 does not receive a high-secure level instruction, the processor 130 can only read and write data in the normal region in a normal state.

In some embodiments, data in the secure region can be sensitive data or secure data (e.g., high-secure level data such as library or streaming data).

In some embodiments, the non-volatile memory 120 can further be used to store at least a lower-level secure program. In further embodiments, the higher-level secure program can be a secure user (e.g., a client application (CA) (i.e., user program with high-secure authority) in the open source trust execution environment (OP-TEE)), and can also be an operating system driver (OS driver) (e.g., LINUX driver). The lower-level secure program can be a secure program in the TEE (e.g., a trust application in OP-TEE) (i.e. a client program with high-secure authority). In addition, the higher-level secure program can receive or transmit data from corresponding lower-level secure program. In this way, in the high-secure level state, the processor 130 can receive or transmit, through the lower-level secure program, data from the higher-level secure program, and read and write, through the lower-level secure program, data in the secure region in the high-level secure level state.

In some embodiments, the temporary memory 110 is, for example, any type of fixed or removable dynamic random access memory (DRAM) or static random access memory (SRAM), etc. and other volatile storage or similar components or a combination of the above components.

In some embodiments, the non-volatile memory 120 is, for example, any type of fixed or removable read-only memory (ROM), flash memory, hard disk drive (HDD) or solid state drive (SSD) or similar components or a combination of the above components.

In some embodiments, the processor 130 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), arithmetic logic unit (ALU), complex programmable logic device (CPLD), field programmable gate array (FPGA) or other similar components or a combination of the above components.

In some embodiments, the processor 130 can be connected to the temporary memory 110 and the non-volatile memory 120 in a wired or wireless method.

For the wired method, the above-mentioned connection method can be through universal serial bus (USB), RS232, universal asynchronous receiver/transmitter (UART), internal integration circuit (I2C), serial peripheral interface (SPI), display port, thunderbolt or local area network (LAN) interface connection method.

For the wireless method, the above-mentioned connection method can be through a wireless fidelity (Wi-Fi) module, a radio frequency identification (RFID) module, Bluetooth module, infrared module, near-field communication (NFC) module or device-to-device (D2D) module connection method.

Figure 2:
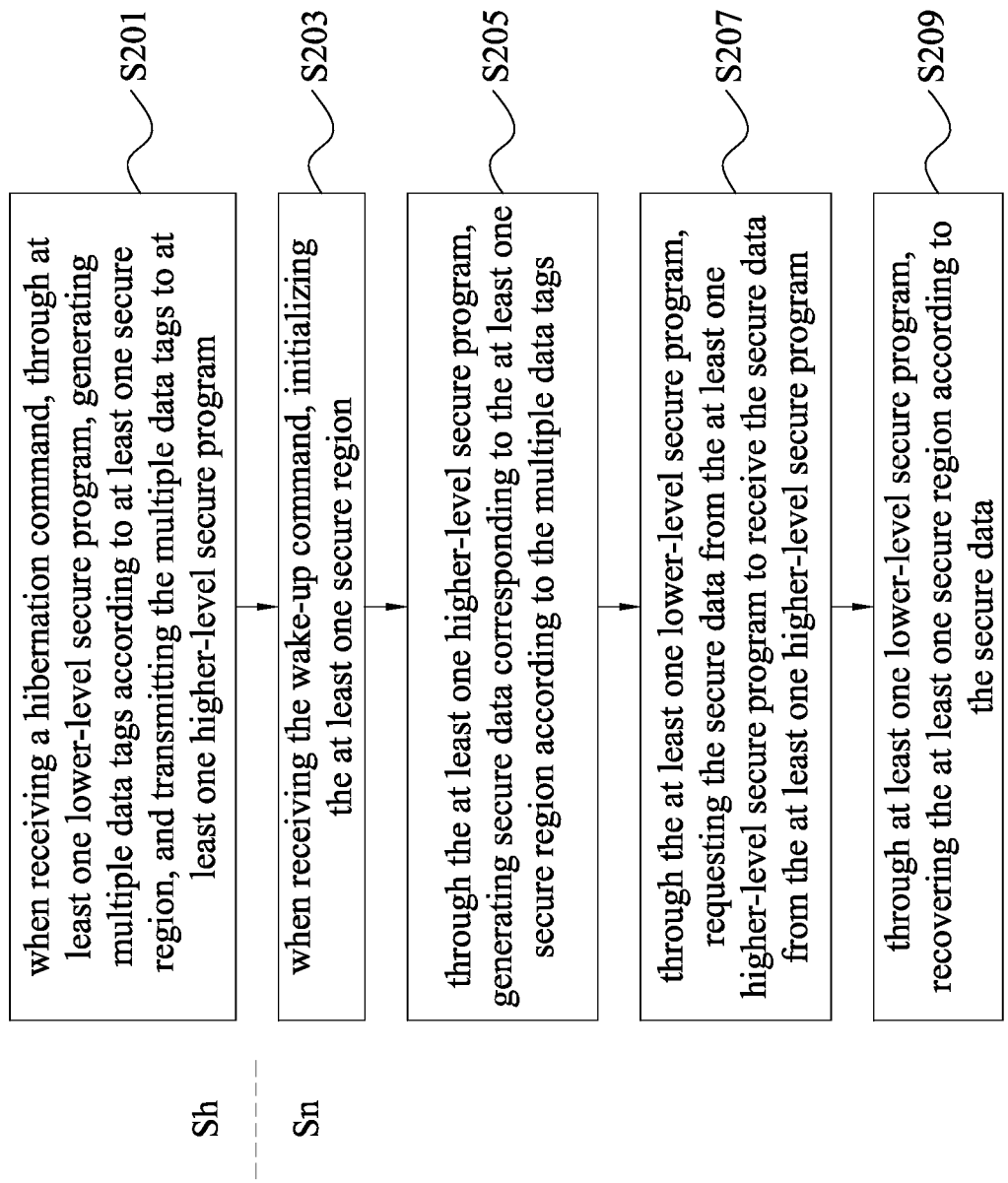
FIG. 2 is a flowchart of a hibernation recovery method according to an embodiment of the present disclosure.
Figure 3:
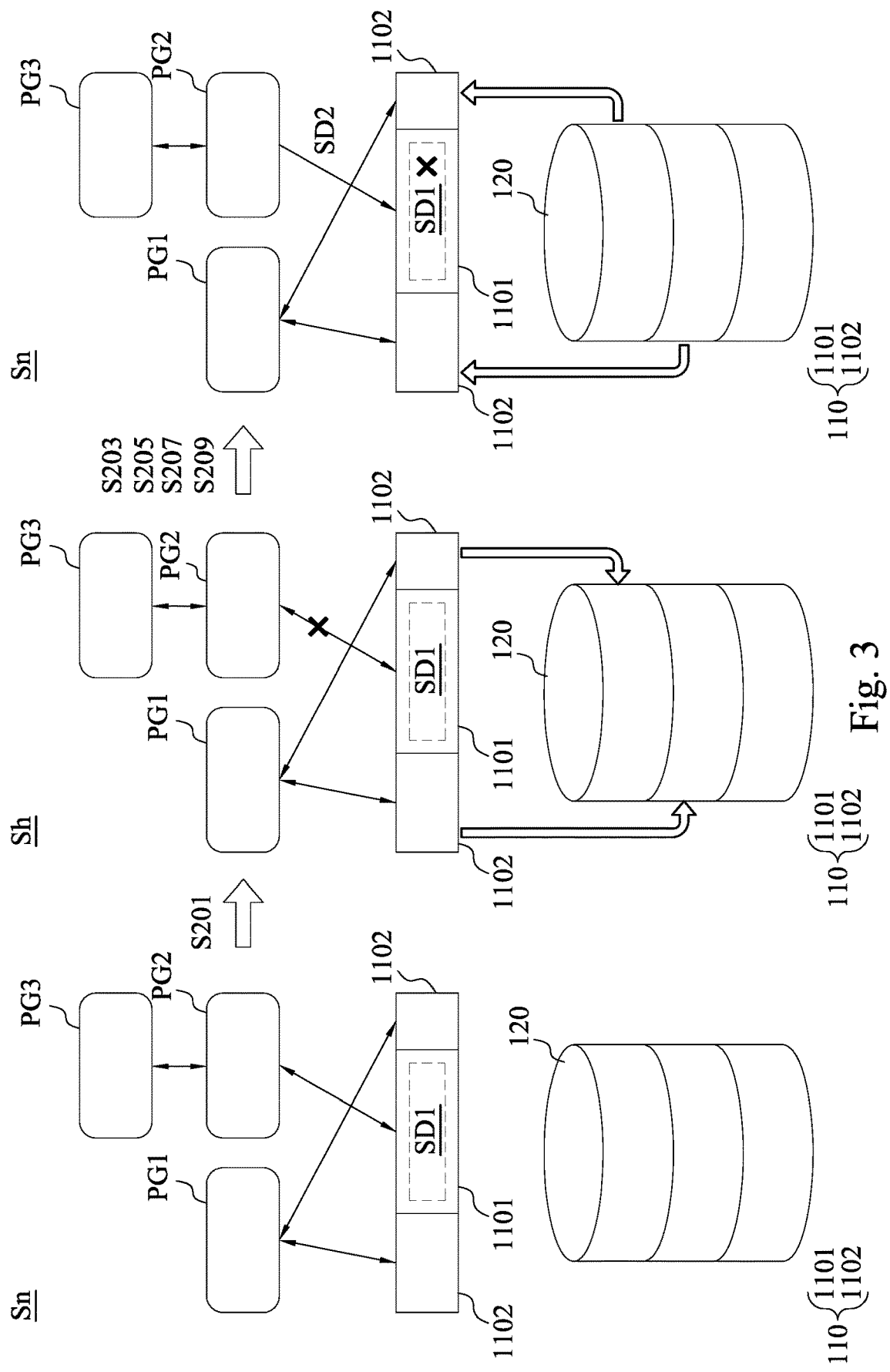
FIG. 3 is a schematic diagram of the hibernation recovery method according to some exemplary embodiments of the present disclosure.

FIG. 2 is a flowchart of a hibernation recovery method according to an embodiment of the present disclosure. FIG. 3 is a schematic diagram of the hibernation recovery method according to some exemplary embodiments of the present disclosure. The method of the embodiment shown in FIG. 2 is applicable to the electronic device 100 of FIG. 1, but is not limited to this. For the sake of convenience and clear description, detailed steps of the hibernation recovery method shown in FIG. 2 will be described with the operation relationship between the components in the electronic device 100 by referring to FIG. 1, FIG. 2 and FIG. 3 at the same time.

First, in step S201, when the processor 130 receives a hibernation command, through at least one lower-level secure program PG2 stored in the non-volatile memory 120, the processor 130 generates multiple data tags according to at least one secure region 1101, and transmit the multiple data tags to at least one higher-level secure program PG3 stored in the non-volatile memory 120.

In detail, when the processor 130 is in a normal state Sn, the processor 130 reads and writes, through a normal program PG1, a normal region 1102 in the temporary memory 110. When the processor 130 receives the hibernation command, the processor 130 first enters the high-secure level state, and reads, through the at least one lower-level secure program PG2, data SD1 in the at least one secure region 1101, so as to generate multiple data tags corresponding to the data SD1 in the at least one secure region 1101. In this way, the processor 130 transmits, through the at least one lower-level secure program PG2, these data tags to the at least one higher-level secure program PG3. Accordingly, the processor 130 stores, through the at least one higher-level secure program PG3, these data tags. After that, the processor 130 enters a hibernation state Sh.

In some embodiments, when the processor 130 receives the hibernation command, the processor 130 can first enter the high-secure level state, and invalidates, through the at least one lower-level secure program PG2, the data SD1 in the at least one secure region 1101.

In some embodiments, the data tags can be tags corresponding to the data SD1 of the secure region 1101. For example, if data in the secure region 1101 includes multiple image frames, the data tags can be timestamps corresponding to these image frames.

In some embodiments, after the processor 130 generates the data tags, the processor 130 can erase the data SD1 in the at least one secure region 1101.

In some embodiments, when the processor 130 receives the hibernation command, the processor 130 erases at least the memory location information stored in the lower-level secure program PG2, where the memory location information corresponds to the at least one secure region 1101. In detail, the memory location information can indicate at least one data address in the at least one secure region 1101 corresponding to the at least secure region PG2. In other words, when the processor 130 does not enter the hibernation state Sh, the processor 130 can enter a high-secure level state, and read and write, through at least the lower-level secure program PG2, the above-mentioned data address.

In some embodiments, the processor 130 can store data of at least one normal region 1102 in the temporary memory 110 into the non-volatile memory 120.

In some embodiments, when the system (e.g., LINUX kernel) receives the hibernation command, the processor 130 and the system can inform, through the at least one higher-level secure program PG3 (also can be OS driver), at least the lower-level secure program PG2 before entering the hibernation state Sh, and enter the at least one higher-level secure program PG3 and the at least one lower-level secure program PG2 into a suspended state (e.g., a freeze state in LINUX). After that, the processor 130 can enter the hibernation state Sh.

It is worth noting that when the at least one higher-level secure program PG3 informs at least the lower-level secure program PG2, at least the lower-level secure program PG2 can also directly write the data SD1 in the at least one secure region 1101 into the non-volatile memory 120 to directly rebuild the data SD1 from the non-volatile memory 120 in a subsequent wake-up period.

Next, in step S203, when the processor 130 receives the wake-up command, the processor 130 initializes the at least one secure region 1101 in the temporary memory 110.

In detail, when the processor 130 receives the wake-up command, the processor 130 and the system recover, and initialize the at least one secure region 1101 in the temporary memory 110. After that, the processor 130 enters the normal state Sn.

In some embodiments, when the processor 130 receives the wake-up command, the processor 130 can enter at least the lower-level secure program PG2 into a activated state (i.e., the at least the lower-level secure program PG2 is activated), and transmit, through the at least one lower-level secure program PG2, the wake-up command to the at least one higher-level secure program PG3, so as to enter the at least one higher-level secure program PG3 into the activated state (i.e., the at least one higher-level secure program PG3 is activated).

Next, in step S205, through the at least one higher-level secure program PG3 stored in the non-volatile memory 120, the processor 130 generates secure data SD2 corresponding to the at least one secure region 1101 according to the multiple data tags.

In detail, the processor 130 rebuilds and generates, through the at least one higher-level secure program PG3, the secure data SD2 according to the multiple previously stored data tags. For example, the processor 130 receives, through at least one higher-level secure program PG3, image data that is the same or similar to the data SD1 in the at least one secure region 1101 using the timestamps in the multiple data tags again.

It is worth noting that if at least the lower-level secure program PG2 has written the data SD1 in at least one secure region 1101 into the non-volatile memory 120 before entering the hibernation state, the processor 130 can also directly read, through at least the lower-level secure program PG2, data related to the at least one secure region 1101 stored in the non-volatile memory 120 before entering the hibernation state Sh to rebuild the secure data SD2 according to this data, so as to write the secure data SD2 into the at least one secure region 1101. In this way, following steps S207 and S209 can be omitted directly.

Next, in step S207, through the at least one lower-level secure program PG2, the processor 130 requests the secure data SD2 from the at least one higher-level secure program PG3 to receive the secure data SD2 from the at least one higher-level secure program PG3.

In detail, the processor 130 transmits, through the at least one lower-level secure program PG2, a request message to the at least one higher-level secure program PG3. In response to the request message, the processor 130 transmits, through the at least one higher-level secure program PG3, the secure data SD2 to the at least one lower-level secure program PG2.

Finally, in step S209, through at least one lower-level secure program PG2, the processor 130 recovers the at least one secure region 1101 according to the secure data SD2.

In detail, the processor 130 first enters the high-secure level state, and stores, through at least one lower-level secure program PG2, the secure data SD2 in the at least one secure region 1101.

In some embodiments, the processor 130 can first enter the high-secure level state, and generate new memory location information according to at least one new data address corresponding to the secure data SD2 in the at least one secure region 1101. In this way, the processor 130 can store, through the at least one lower-level secure program PG2, new memory location information, where the new memory location information can indicate the at least one new data address in the at least one security section 1101 corresponding to the at least one lower-level secure program PG2.

In some embodiments, the processor 130 can read the above-mentioned data originally stored in the normal region 1102 in the non-volatile memory 120 and store this data in the at least one normal region 1102 of the temporary memory 110 again.

By the above-mentioned steps, the electronic device 100 of the embodiment of the present disclosure can back up the data in the normal region 1102 in the temporary memory 110 into the non-volatile memory 120 before entering the hibernation state Sh, and store, through the at least one higher-level secure program PG3, the data tags corresponding to the secure region 1101 in the temporary memory 110. In this way, the electronic device 100 can read the data originally stored in the normal region 1102 from the non-volatile memory 120 after entering the normal state Sn, and read, through the at least one higher-level secure program PG3, the data tags, so as to use the above-mentioned data and data tags to recover a processing state before hibernation. Accordingly, the processing state of the processor 130 before the hibernation state Sh and a processing state after recovery from the hibernation state Sh can be made the same or similar to avoid the inconsistency of the processing state before the sleep state Sh and the processing state after recovery from the hibernation state Sh.

Figure 4:
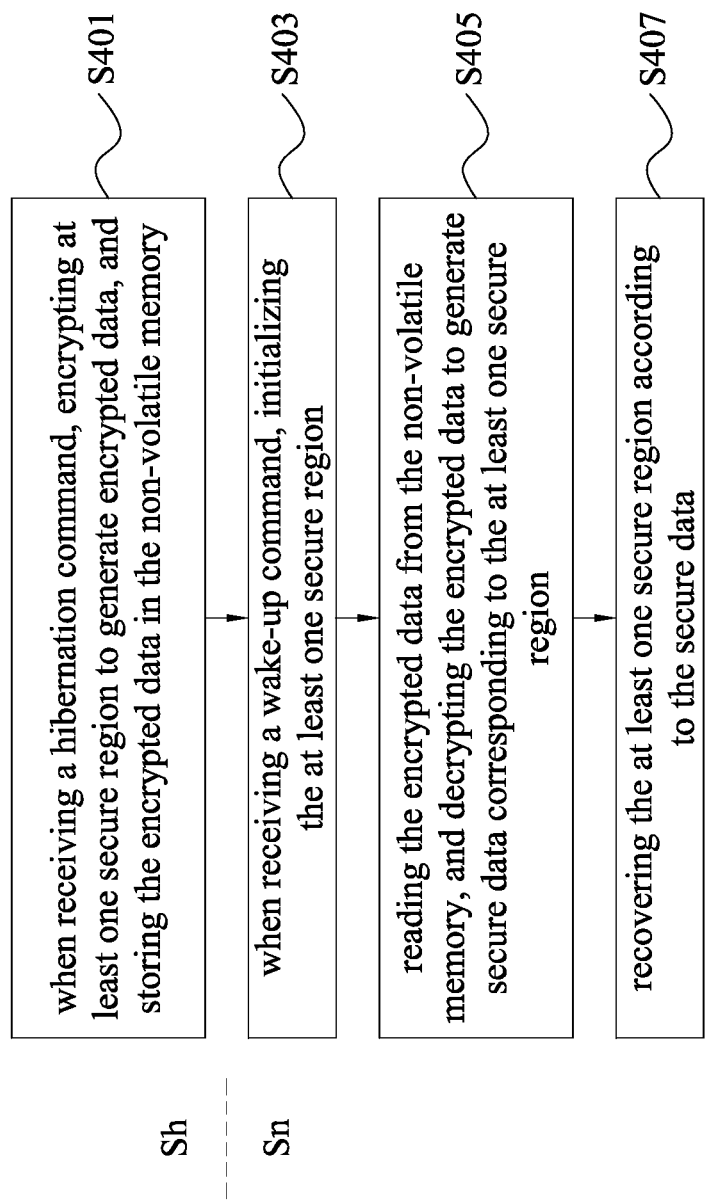
FIG. 4 is a flowchart of the hibernation recovery method according to other embodiments of the present disclosure.

FIG. 4 is a flowchart of the hibernation recovery method according to other embodiments of the present disclosure. FIG. 5 is a schematic diagram of the hibernation recovery method according to other embodiments of the present disclosure. The method of the embodiment shown in FIG. 4 is applicable to the electronic device 100 of FIG. 1, but is not limited to this. For the sake of convenience and clear description, detailed steps of the hibernation recovery method shown in FIG. 4 will be described with the operation relationship between the components in the electronic device 100 by referring to FIG. 1, FIG. 4 and FIG. 5 at the same time.

First, in step S401, when the processor 130 receives a hibernation command, the processor 130 encrypts at least one secure region 1101 in the temporary memory 110 to generate encrypted data ED, and store the encrypted data ED in the non-volatile memory 120.

In detail, when the processor 130 receives the hibernation command, the processor 130 first enters a high-secure level state, and encrypt the at least one secure region 1101 in the temporary memory 110 (i.e., encrypt data SD1 in at least one secure region 1101), so as to store the generated encrypted data ED in the non-volatile memory 120.

In some embodiments, the at least one secure region 1101 can include at least one used block and at least one unused block, where the used block is a region with stored data, and the unused block is a region without the stored data. When the processor 130 receives the hibernation command, the processor 130 can encrypt the at least one used block to generate the encrypted data ED, and store the encrypted data ED in the non-volatile memory 120. In other words, the processor 130 can only encrypt the used block to generate the encrypted data ED.

In some embodiments, when the processor 130 receives the hibernation command, the processor 130 can first enter the high-secure level state and execute a secure operating system (secure OS). In this way, the processor 130 can encrypt, through an encryption and decryption program EDP in the secure operating system, the data SD1 in the at least one secure region 1101.

In further embodiments, the processor 130 can perform, through the encryption and decryption program EDP, software encryption on the data SD1 in the at least one secure region 1101 according to a key stored in the secure operating system to generate the encrypted data ED.

In other embodiments, the electronic device 100 can further include an encryption circuit (e.g., a circuit-private) (not shown) or an encryption processor (not shown). When the processor 130 receives the hibernation command, the processor 130 can first enter the high-secure level state, and further perform, through the encryption circuit or the encryption processor, hardware encryption on the data SD1 in the at least one secure region 1101 to generate the encrypted data ED.

In other embodiments, when the processor 130 receives the hibernation command, the processor 130 can first enter a high-secure level state, and further perform, through a driver program, a call-back program, or a function-call program, hardware encryption on the data SD1 in at least one secure region 1101 to generate the encrypted data ED.

In some embodiments, the processor 130 can store data in at least one normal region 1102 in the temporary memory 110 into the non-volatile memory 120.

In some embodiments, when the processor 130 receives the hibernation command, the processor 130 can transmit, through at least one higher-level secure program PG3, the hibernation command to at least one lower-level secure program PG2 before entering the hibernation state Sh (i.e., the hibernation state can be triggered by the system or OS), and enter the at least one higher-level secure program PG3 and the at least one lower-level secure program PG2 into a suspended state. After that, the processor 130 can encrypt the data SD1 in the at least one secure region 1101 to generate the encrypted data ED, so as to enter the hibernation state Sh. In other words, the processor 130 can enter at least one higher-level secure program PG3 and at least one lower-level secure program PG2 into the suspended state before performing encryption, so as to prevent the at least one higher-level secure program PG3 and the at least one lower-level secure program PG2 from continuously reading and writing the at least one secure region 1101.

Next, in step S403, when the processor 130 receives a wake-up command, the processor 130 initializes the at least one secure region 1101.

In detail, when the processor 130 receives the wake-up command, the processor 130 recovers, and initializes the at least one secure region 1101 in the temporary memory 110. After that, the processor 130 enters a normal state Sn.

Next, in step S405, the processor 130 reads the encrypted data ED from the non-volatile memory 120, and decrypts the encrypted data ED to generate secure data SD3 corresponding to the at least one secure region 1101.

In detail, the processor 130 decrypts the encrypted data ED stored in the non-volatile memory 120 to generate the secure data SD3, where the secure data SD3 is exactly the same as the previously stored data SD1 in the at least one secure region 1101.

Finally, in step S407, the processor 130 recovers the at least one secure region 1101 according to the secure data SD3.

In detail, the processor 130 first enters the high-secure level state, and stores the secure data SD3 in the at least one secure region 1101.

In some embodiments, the processor 130 can read the above-mentioned data originally stored in the normal region 1102 in the non-volatile memory 121 and store the data in at least one normal region 1102 of the temporary memory 110 again.

In some embodiments, if the secure data SD3 is encrypted and generated from the at least one used block of the at least one secure region 110, the processor 130 can first enter the high-secure level state, and store the secure data SD3 in the at least one used block in the at least one secure region 1101.

In some embodiments, after the processor 130 recovers the at least one secure region 1101, the processor 130 can transmit, through at least the lower-level secure program PG2, the wake-up command to the at least one higher-level secure program PG3, and enter at least one higher-level secure program PG3 and the at least one lower-level secure program PG2 into a activated state. In other words, the processor 130 can enter the at least one higher-level secure program PG3 and the at least one lower-level secure program PG2 into the activated state after recovering the at least one secure section 1101, so as to prevent the at least one higher-level secure program PG3 and the at least one lower-level secure program PG2 from firstly reading and writing the at least one secure region 1101.

By the above-mentioned steps, the electronic device 100 of the embodiment of the present disclosure can back up the data in the secure region 1101 and the normal region 1102 of the temporary memory 110 into the non-volatile memory 120 before entering the hibernation state Sh. In this way, the electronic device 100 can read the above-mentioned data from the non-volatile memory 120 after entering the normal state Sn, and use the above-mentioned data to return to a processing state before hibernation. Accordingly, the processing state of the processor 130 before the hibernation state Sh and a processing state after recovery from the hibernation state Sh can be made the same, so as to avoid the inconsistency of the processing state before the hibernation state Sh and the processing state after recovery from the hibernation state Sh.

In summary, the electronic device and hibernation recovery method thereof of the embodiments of the present disclosure can recover the data of the secure region by using the tags corresponding to the secure region with the high-secure level in the temporary memory, or pre-encrypt and back up the data in the secure region with the high-secure level in the temporary memory to recover the data in the secure region. In this way, a system state before and after hibernation can be fully or partially recovered, so as to avoid the problem of inconsistent system state before and after hibernation due to the inability to back up data in the secure region.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising: a temporary memory, comprising at least one secure region; a non-volatile memory, configured to store at least one first secure program, at least one second secure program and a plurality of commands; and a processor, connected to the temporary memory and the non-volatile memory for executing the plurality of commands to: when receiving a wake-up command, initialize the at least one secure region, further comprising: enter the at least one second secure program into an activated state; and transmit, through the at least one second secure program, the wake-up command to the at least one first secure program to enter the at least one first secure program into the activated state; and recover, through the at least one first secure program, the at least one secure region.

2. The electronic device of claim 1, wherein the processor is further configured to:
generate, through the at least one second secure program, a plurality of data tags according to the at least one secure region and transmit the plurality of data tags to the at least one first secure program when receiving a hibernation command.

3. The electronic device of claim 2, wherein the processor is further configured to:
transmit, through the at least one first secure program, the hibernation command to the at least one second secure program to enter the at least one first secure program and the at least one second secure program into a hibernation state when receiving the hibernation command.

4. The electronic device of claim 2, wherein the processor is further configured to:
when receiving the hibernation command, erase memory location information stored by the at least second secure program, wherein the memory location information corresponds to the at least one secure region.

5. The electronic device of claim 2, wherein the processor is further configured to:
generate, through the at least one first secure program, secure data corresponding to the at least one secure region according to the plurality of data tags when receiving the wake-up command;
request, through the at least one second secure program, the secure data from the at least one first secure program to receive the secure data from the at least one first secure program; and
recover, through the at least one second secure program, the at least one secure region according to the secure data.

6. The electronic device of claim 2, wherein when receiving the hibernation command, the processor further stores the at least one secure region in the non-volatile memory through the at least one second secure program, and the processor is further configured to:
read, through the at least one second secure program, secure data from the non-volatile memory when receiving the wake-up command; and
recover, through the at least one second secure program, the at least one secure region according to the secure data.

7. The electronic device of claim 1, wherein the processor is further configured to:
encrypt the at least one secure region to generate encrypted data and store the encrypted data in the non-volatile memory when receiving a hibernation command.

8. The electronic device of claim 7, wherein the processor is further configured to:
read the encrypted data stored in the non-volatile memory to decrypt the encrypted data to generate secure data corresponding to the at least one secure region when receiving the wake-up command; and
recover the at least one secure region according to the secure data.

9. The electronic device of claim 1, wherein the at least one secure region comprises at least one used block and at least one unused block, and the processor is further configured to:
encrypt the at least one used block to generate encrypted data and store the encrypted data in the non-volatile memory when receiving a hibernation command.

10. The electronic device of claim 9, wherein the processor is further configured to:
read the encrypted data stored in the non-volatile memory and decrypt the encrypted data to generate secure data corresponding to the at least one secure region when receiving the wake-up command; and
recover the at least one used block according to the secure data.

11. A hibernation recovery method, comprising:
activating, by a processor, at least one second secure program when receiving a wake-up command;
transmitting, by the processor, the wake-up command to at least one first secure program stored in a non-volatile memory to activate the at least one first secure program through the at least one second secure program;
initializing, by the processor, at least one secure region in a temporary memory; and
recovering, by the processor, the at least one secure region through the at least one first secure program.

12. The hibernation recovery method of claim 11, further comprises:
generating, by the processor, a plurality of data tags according to the at least one secure region and transmit the plurality of data tags to the at least one first secure program through the at least one second secure program when receiving a hibernation command.

13. The hibernation recovery method of claim 12, further comprising:
transmitting, by the processor, the hibernation command to the at least one second secure program, and entering the at least one first secure program and the at least one second secure program into a hibernation state through the at least one first secure program when receiving the hibernation command.

14. The hibernation recovery method of claim 12, further comprising:
when receiving the hibernation command, erasing, by the processor, memory location information stored by the at least second secure program, wherein the memory location information corresponds to the at least one secure region.

15. The hibernation recovery method of claim 12, wherein the step of recovering the at least one secure region comprises:
when receiving the wake-up command, through the at least one first secure program, generating, by the processor, secure data corresponding to the at least one secure region according to the plurality of data tags;
requesting, by the processor, the secure data from the at least one first secure program to receive the secure data from the at least one first secure program through the at least one second secure program; and
recovering, by the processor, the at least one secure region according to the secure data through the at least one second secure program.

16. The hibernation recovery method of claim 12, wherein when receiving the hibernation command, the at least one secure region is further stored in the non-volatile memory through the at least one second secure program, the step of recovering the at least one secure region comprises:
reading, by the processor, secure data from the non-volatile memory through the at least one second secure program when receiving the wake-up command; and recovering, by the processor, the at least one secure region according to the secure data through the at least one second secure program.

17. The hibernation recovery method of claim 11, further comprising:
   when receiving a hibernation command, encrypting, by the processor, the at least one secure region to generate encrypted data and store the encrypted data in the non-volatile memory.

18. The hibernation recovery method of claim 17, further comprising
   reading, by the processor, the encrypted data stored in the non-volatile memory and decrypting the encrypted data to generate secure data corresponding to the at least one secure region when receiving the wake-up command; and
   recovering the at least one secure region according to the secure data.

19. The hibernation recovery method of claim 11, wherein the at least one secure region comprises at least one used block and at least one unused block, and the hibernation recovery method further comprises:
   encrypting, by the processor, the at least one used block to generate encrypted data and store the encrypted data in the non-volatile memory when receiving a hibernation command.

20. The hibernation recovery method of claim 19, further comprising:
   when receiving the wake-up command, reading the encrypted data stored in the non-volatile memory, and decrypting the encrypted data to generate secure data corresponding to the at least one secure region; and
   recovering the at least one used block according to the secure data.

* * * * *